United States Patent
Kleeman et al.

(10) Patent No.: US 10,545,263 B2
(45) Date of Patent: Jan. 28, 2020

(54) SYSTEMS AND METHODS FOR GENERATING COMPUTER-BASED REPRESENTATIONS OF PROBABILITIES OF PRECIPITATION OCCURRENCES AND INTENSITIES

(71) Applicant: The Climate Corporation, San Francisco, CA (US)

(72) Inventors: Alex Kleeman, Somerville, MA (US); Todd Small, San Francisco, CA (US)

(73) Assignee: The Climate Corporation, San Francisco, CA (US)

( * ) Notice: Subject to any disclaimer, the term of this patent is extended or adjusted under 35 U.S.C. 154(b) by 515 days.

(21) Appl. No.: 14/798,256

(22) Filed: Jul. 13, 2015

(65) Prior Publication Data

US 2017/0017014 A1    Jan. 19, 2017

(51) Int. Cl.
| | | |
|---|---|---|
| G01W 1/10 | (2006.01) | |
| G06F 19/00 | (2018.01) | |
| G06F 17/18 | (2006.01) | |

(52) U.S. Cl.
CPC .................... *G01W 1/10* (2013.01)

(58) Field of Classification Search
CPC .......... G01W 1/00; G01W 1/10; G06F 17/18; G06F 11/00; G08B 21/10
USPC ........................................... 702/3; 73/170.17
See application file for complete search history.

(56) References Cited

U.S. PATENT DOCUMENTS

| | | | | |
|---|---|---|---|---|
| 8,060,308 B2* | 11/2011 | Breed | .................. | B60N 2/2863 340/601 |
| 2014/0324351 A1* | 10/2014 | Dannevik | ............... | G01W 1/10 702/3 |
| 2016/0047569 A1* | 2/2016 | Fadell | ................ | G05D 23/1902 236/1 C |

OTHER PUBLICATIONS

European Patent Office, "Search Report" in application No. PCT/US2016/029388, dated Jul. 25, 2016, 13 pages.
European Claims in application No. PCT/US2016/029388, dated Jul. 2016, 10 pages.
Clark et al., "Probabilistic Quantitative Precipitation Estimation in Complex Terrain", Journal of Hydrometeorology, vol. 7., No. 1, dated Feb. 1, 2006, 20 pages.

(Continued)

*Primary Examiner* — Gene N Auduong
(74) *Attorney, Agent, or Firm* — Elliot H. Karlin; Hickman Palermo Becker Bingham LLP

(57) ABSTRACT

A method for estimating precipitation values and associated uncertainties is provided. In an embodiment, precipitation records that indicate the occurrence and intensity of precipitation at specific locations are received by a weather computing system. The weather computing system uses the gauge information to separately create multiple realizations of precipitation occurrence fields and precipitation intensity fields. The weather computing system may model the occurrence of precipitation by proposing a value for each point independently and using the proposed value to update all prior proposals. The weather computing system may model the intensity of precipitation by modeling the spatial correlation of precipitation intensity and sampling from distributions at each location to determine the intensity of precipitation at each location. The weather computing system may then combine the precipitation intensity and occurrence fields into one or more final estimate fields.

30 Claims, 7 Drawing Sheets

(56) References Cited

OTHER PUBLICATIONS

The International Bureau of WIPO, "International Preliminary Report on Patentability", in application No. PCT/US2016/029388, dated Jan. 16, 2018, 9.
Current Claims in application No. PCT/US2016/029388, dated Jan. 2018, 10 pages.
Clark et al., "Probabilistic Quantitative Precipitation Estimnation in Complex Terrain", Journal of Hydrometeorology, vol. 7, No. 1, dated Feb. 1, 2016, pp. 3-22.
The International Bureau of WIPO, "International Preliminary Report" in application No. PCT/US2017/062867, dated May 28, 2019, 6 pages.
European Patent Office, "Search Report", in application No. 16 723 866.6-1001, dated Apr. 30, 2019, 5 pages.
European Claims in application No. 16 723 866.6-1001, dated Apr. 2019, 7 pages.
Current Claims in application No. PCT/US2017/062867, dated May 2019.

* cited by examiner

SYSTEMS AND METHODS FOR GENERATING COMPUTER-BASED REPRESENTATIONS OF PROBABILITIES OF PRECIPITATION OCCURRENCES AND INTENSITIES

FIELD OF THE DISCLOSURE

The present disclosure generally relates to computer systems useful in climatology and agriculture. The disclosure relates more specifically to computer systems that are programmed to provide large scale probabilistic estimates of precipitation at precise locations.

BACKGROUND

The occurrence and intensity of rainfall can have a significant impact for agricultural growers. Data relating to precipitation can be extremely valuable to agricultural growers in making strategic decisions. Computer-based agronomic models may rely on historical observations of precipitation to create forecasts for future precipitation.

While precipitation data is extremely valuable, it is not always readily available. While many areas are currently monitored by satellite or radar, some areas only receive current precipitation data through rain gauges at specific locations. Other areas are currently monitored by satellite or radar, but historically only received precipitation data through rain gauges.

Because of the lack of both historical data and current data in some locations, it becomes important to create reliable estimates for rainfall at precise locations. Current modeling techniques can be used to estimate rainfall at given points based on gauge observations. Various problems exist with modern modeling techniques. First, many modeling techniques fail to take into account the spatial correlation of rainfall such that the probability of rainfall at a given location will sharply increase if neighboring gauges observed rainfall. Second, while current models can estimate rainfall at given locations, creating large scale models based on a wide array of observations becomes computationally prohibitive. Finally, while many modeling techniques can estimate rainfall at a given location, they are unable to propagate probabilistic estimates. In creating a large scale field, creating accurate estimates becomes even more difficult as the point estimates do not include the propagating error that would exist in a probabilistic estimate.

SUMMARY OF THE DISCLOSURE

The appended claims may serve as a summary of the disclosure.

DETAILED DESCRIPTION

Figure 1:
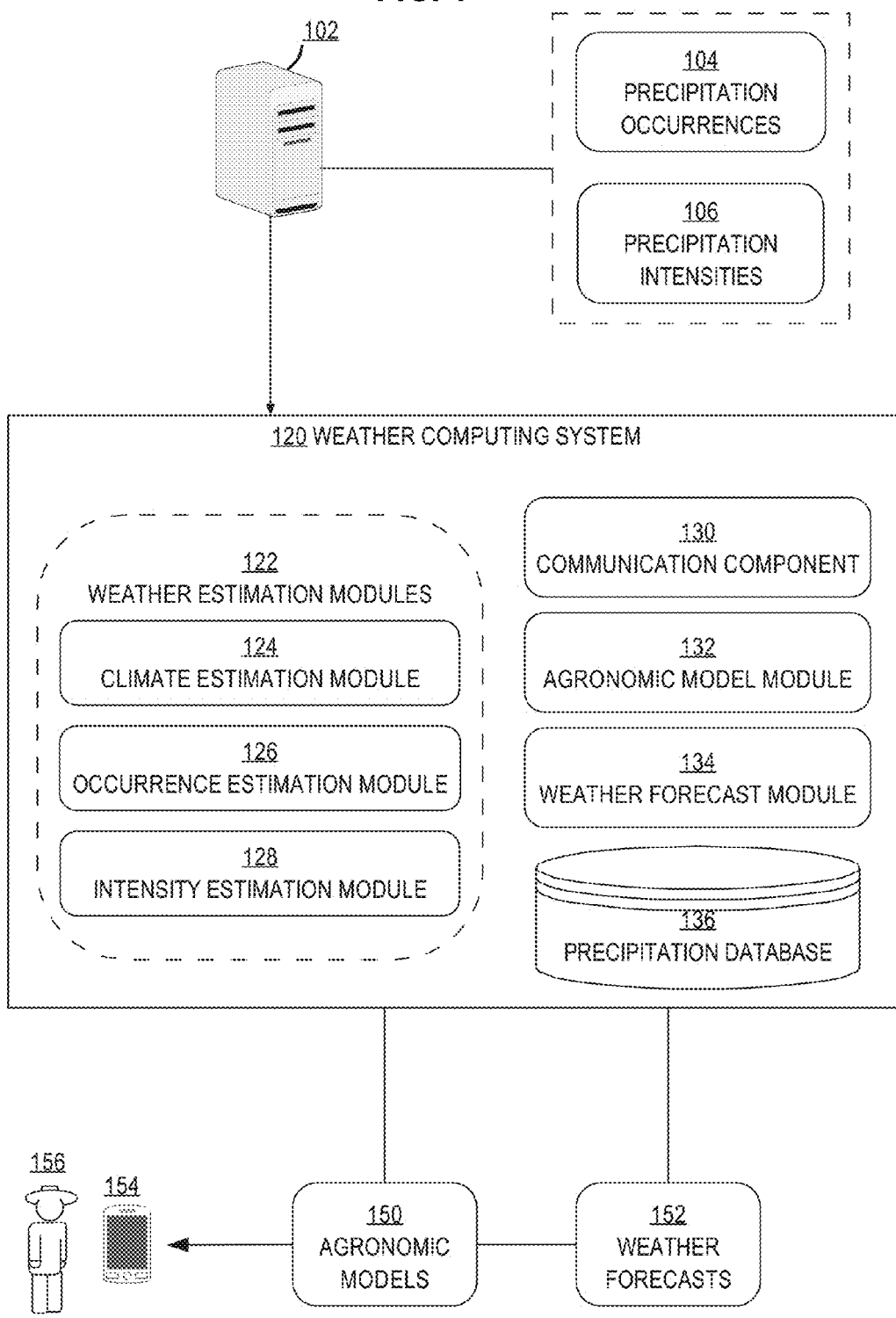
FIG. 1 illustrates an example computer system that is configured for estimating historical precipitation values.

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure. The description is provided according to the following outline:

General Overview
Structural Overview
Two-Stage Model
Precipitation Occurrence
   Expectation Propagation
   Fully Independent Training Conditional
Precipitation Intensity
   Tapering
Combined Fields
Data Usage
   Weather Forecasting
   Agronomic Application
Hardware Overview
Benefits Of Certain Embodiments
Extensions And Alternatives
General Overview Aspects of the disclosure generally relate to computer-implemented techniques for creating probabilistic estimates of precipitation occurrence and intensity at a granular level and at a large scale. In an embodiment, a weather computing system receives rainfall data that indicates the occurrence of precipitation and the intensity of precipitation at a plurality of locations. The weather computing system separately estimates the probability of occurrence of precipitation and the probability distribution for the intensity of precipitation at precise locations for a large area. The weather computing system first creates an occurrence field which models the probability of precipitation occurrence based on the measurements at the plurality of locations. The weather computing system then creates an probability distribution which models the intensity of precipitation based on the intensities at neighboring locations. The weather computing system then constructs probabilistic estimates for the occurrence and intensity of precipitation at a large scale. The estimates are formed as electronically stored digital data and each of the foregoing process steps may be executed using programmed computer logic.

In an embodiment, a data processing method comprises receiving, over a computer network, one or more digital precipitation records comprising a plurality of digital data values representing an occurrence of precipitation at a first plurality of locations and an intensity of precipitation at the first plurality of locations; using digitally programmed logic in an occurrence estimation module of a digital electronic weather computer, creating and storing in a precipitation database one or more precipitation occurrence fields; using digitally programmed logic in an intensity estimation module of the weather computer, creating and storing in the precipitation database one or precipitation intensity fields; using digitally programmed logic in the climate estimating module, creating and digitally storing final estimates for precipitation occurrence and intensity at one or more locations of the second plurality of locations based on the one or more precipitation occurrence fields and the one or more precipitation intensity fields.

In an embodiment, the occurrence estimation module creates the one or more precipitation occurrence fields by: for a first location of a second plurality of locations, creating a probabilistic estimate of the occurrence of precipitation at the first location based on the plurality of data values representing the occurrence of precipitation at the first plurality of locations; for each subsequent location of the second plurality of locations: creating a probabilistic estimate of the occurrence of precipitation at the subsequent location based on the occurrences of precipitation at the first plurality of locations and one or more probabilistic estimates describing the occurrence of precipitation at one or more other locations of the second plurality of locations; updating the one or more probabilistic estimates of the occurrence of precipitation at the one or more other locations of the second plurality of locations based on the probabilistic estimate of the occurrence of precipitation at the subsequent location In an embodiment, the intensity estimation module creates the one or more precipitation intensity fields by: for each location of the second plurality of locations: creating and storing one or more data values that describe relationships between an intensity of precipitation at the location and an intensity of precipitation at one or more other locations of the second plurality of locations; creating and storing one or more distributions of the intensity of precipitation at the location, including digitally constraining the distributions by the intensity of precipitation at the one or more other locations of the second plurality of locations and/or the data values representing the intensity of precipitation at the first plurality of locations; extracting one or more data values representing probabilistic estimates for intensity based on the one or more data values that describe relationships and the one or more distributions of the intensity of precipitation at the location; aggregating the extracted one or more data values into the one or more precipitation intensity fields.

Other features and aspects of the disclosure will become apparent in the drawings, description and the claims.

Structural Overview

FIG. 1 is an example computer system that is configured for estimating historical precipitation values using a weather computing system.

In an embodiment, a precipitation server computer 102 stores or can access precipitation occurrences 104 and precipitation intensities 106, and is communicatively coupled to a weather computer 120 that is programmed or configured to generate agronomic models 150 and weather forecasts 152 to communicate with a mobile computing device 154. Computer 102, system 120, and device 154 may be communicatively coupled directly or indirectly via one or more networks or internetworks. The precipitation server computer 102 is configured to send data values representing precipitation occurrences 104 and precipitation intensities 106 for a plurality of locations to weather computing system 120. Weather computing system 120 is configured to interact with mobile computing device 154 which may be associated with a user 156. In additional embodiments, weather computing system 120 may also be configured to interact with one or more other devices such as an application server, other climatology computing systems, or other third party devices.

In an embodiment, weather computing system 120 is programmed with or comprises weather estimation modules 122, communication component 130, agronomic model module 132, weather forecast module 134, and precipitation database 136. Weather estimation modules 122 include climate estimation module 124, occurrence estimation module 126, and intensity estimation module 128. Each of the foregoing elements is further described in structure and function in other sections herein. Weather computer system 120 also may include other devices, components or elements of a computer system such as volatile or non-volatile memory, non-volatile storage such as disk, and I/O devices or interfaces as seen and described, for example, in connection with FIG. 5.

In an embodiment, weather estimation modules 122 are generally configured or programmed to perform translation and storage of data, aggregation of data, and precipitation estimation. Climate estimation module 124 is generally configured or programmed to receive precipitation occurrence fields from occurrence estimation module 126 and precipitation intensity fields from intensity estimation module 128. Climate estimation module 124 is further configured or programmed to construct final estimates based at least in part on the received precipitation occurrence fields and precipitation intensity fields. In embodiments, climate estimation module sends the final estimates to agronomic model module 132, weather forecast module 134, or precipitation database 136. Occurrence estimation module 126 is generally configured or programmed to receive precipitation occurrences 104, construct one or more precipitation occurrence fields based on precipitation occurrences 104, and send the one or more precipitation occurrence fields to climate estimation module 124, agronomic model module 132, weather forecast module 134, or precipitation database 136. Intensity estimation module 128 is generally configured or programmed to receive precipitation intensities 106, construct one or more precipitation intensity fields based on precipitation intensities 106, and send the one or more precipitation intensity fields to climate estimation module 124, agronomic model module, 132, weather forecast module 134, or precipitation database 136.

Communication component 130 is generally configured or programmed to send and receive data to one or more computing devices. In an embodiment, communication component is configured or programmed to request and receive precipitation occurrences 104 and precipitation intensities 106 from precipitation server computer 102. Communication component 130 may also be generally configured or programmed to receive requests for agronomic models 150 and weather forecasts 152 from mobile computing device 154 and to send agronomic models 150 and weather forecasts 152 to mobile computing device 154. Additionally, communication component 130 may be generally configured or programmed to communicate with one or more other computing devices such as an application server, other climatology computing systems, or other third party devices.

Agronomic model module 132 is generally configured or programmed to estimate and store agronomic data relating to one or more physical fields. Agronomic model module 132 may be configured or programmed to receive precipitation occurrence fields from occurrence estimation module 126, precipitation intensity fields from intensity estimation module 128, and final estimates from climate estimation module 124. Agronomic model module 132 may be further configured to calculate one or more agronomic data values for the one or more physical fields based at least in part on the precipitation occurrence fields, the precipitation intensity fields, or the final estimates. Additionally, agronomic model module 132 may be configured or programmed to receive weather forecasts from weather forecast module 134 and to calculate one or more agronomic data values based at least in part on the weather forecasts. Agronomic model module 132 may create one or more agronomic models 150 comprising the one or more agronomic data values for the one or more physical fields and send the one or more agronomic models 150 to mobile computing device 154.

Weather forecast module 134 is generally configured or programmed to estimate current or future precipitation data. Weather forecast module 134 may be configured or programmed to receive precipitation occurrence fields from occurrence estimation module 126, precipitation intensity fields from intensity estimation module 128, and final estimates from climate estimation module 124. Weather forecast module 134 may estimate the current or future precipitation data based at least in part on the precipitation intensity fields, the precipitation occurrence fields, or the final estimates. Weather forecast module 134 may aggregate the estimated current or future precipitation data into weather forecasts 152. Weather forecast module 134 may send weather forecasts 152 to agronomic model module 132 or mobile computing device 154. Weather forecast module 134 may also store weather forecasts 152 in order to test the reliability of the modeling methods used to create the precipitation occurrence fields, the precipitation intensity fields, or the final estimates.

Precipitation database 136 may be configured or programmed to store data relating to precipitation. Precipitation database 136 may store precipitation occurrences 104, precipitation intensities 106, precipitation intensity fields, precipitation occurrence fields, and final estimates. Precipitation data in precipitation database 136 may be grouped by time, location, and/or whether the precipitation data relates to occurrence or intensity for ease of access. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database may be used that enables the systems and methods described herein.

For purposes of illustrating a clear example, FIG. 1 shows a limited number of instances of certain functional elements. However, in other embodiments, there may be any number of such elements. For example, embodiments may use thousands or millions of different mobile computing devices 154 associated with different users. Further, system 120 and server computer 102 may be implemented using two or more processors, cores, clusters, or instances of physical machines or virtual machines, configured in a discrete location or co-located with other elements in a datacenter, shared computing facility or cloud computing facility.

Each of the weather estimation modules 122, agronomic model module 132, and weather forecast module 134 may be implemented using one or more computer programs or other software elements that are loaded into and executed using one or more general-purpose computers, logic implemented in field programmable gate arrays (FPGAs) or application-specific integrated circuits (ASICs). While FIG. 1 depicts weather estimation modules 122, agronomic model module 132, and weather forecast module 134 in one computing system, in various embodiments, modules 122, 132, and 134 operate on multiple computing systems.

In an embodiment, the implementation of the functions described herein for weather estimation modules 122, agronomic model module 132, and weather forecast module 134 using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve as algorithms, plans or directions that may be used to program a computer or logic to implement the functions that are described.

Weather computing system 120 may communicate with mobile computing device 154 and precipitation server computer 102 through communication component 130 over one or more computer networks. The network(s) may be implemented by any medium or mechanism that provides for the exchange of data between the various elements of FIG. 1. Examples include one or more Local Area Networks (LANs), Wide Area Networks (WANs), or internetworks using terrestrial, satellite or wireless links. The various elements of FIG. 1 may also have direct (wired or wireless) communications links.

In an embodiment, user 156 interacts with weather computing system 120 using mobile computing device 154 configured with an operating system and one or more application programs or apps. Mobile computing device 154 may be a smart phone, PDA, tablet computing device, laptop, or any other computing device capable of transmitting and receiving information and performing the functions described herein. Mobile computing device 154 may communicate via a network using a suitable method of interaction including a user application stored on mobile computing device 154.

The user application may provide server-side functionality, via the network to one or more mobile computing devices. In an example embodiment, mobile computing device 154 may access the user application via a web client or a programmatic client. Mobile computing device 154 may transmit data to, and receive data from, one or more front-end servers. In an example embodiment, the data may take the form of requests and user information input, such as field-specific data, into the mobile computing device. In some embodiments, the user application interacts with tracking software on mobile computing device 154 which determines the location of mobile computing device 154 using standard tracking techniques such as multilateration of radio signals, the global positioning system (GPS), WiFi positioning systems, or other methods of mobile positioning.

In an embodiment, precipitation server computer 102 contains precipitation occurrences 104 and precipitation intensities 106. Precipitation occurrences 104 and precipitation intensities 106 may be represented by a single data value or by multiple data values for a plurality of locations over a period of time. For example, a single data value may indicate that on Mar. 14, 2015 San Francisco received 9 millimeters of rain. In this case, the precipitation intensity data value may be 9 mm while the precipitation occurrence value may be 1, where a 0 data value would represent no rain and a 1 data value would represent rain. Precipitation server computer 102 may receive precipitation data from a plurality of sensors, devices, or computers at a plurality of locations.

Use of Two-Stage Model

The approaches described herein can be used to create large scale estimates of precipitation for locations that lack precipitation data, to improve estimates of precipitation for locations that lack precipitation data, and/or to create large scale estimates for periods of time where advanced precipitation data is unavailable.

In an embodiment, a computer-implemented two-stage modeling approach is used to separately estimate the probability of occurrence of precipitation and the likely intensity of precipitation over a large area. Estimating the occurrence of precipitation separately from the intensity of precipitation allows weather computing system 120 to create more accurate and computationally efficient estimates. For example, estimates of intensity based on neighboring locations are more likely to show non-zero intensity if any of the neighboring locations show non-zero intensity of rain. This would lead to a model that over-predicts the occurrence of rainfall. Additionally, separating the estimate of occurrence from the estimate of intensity allows weather computing system 120 to take into account explanatory variables that have a larger effect on one model over the other. For example, elevation may have a smaller effect on the estimate of the occurrence of precipitation than it does on the estimation of intensity of precipitation. Thus, the model of occurrence of precipitation would have a smaller dependence on the elevation variable than the estimate of intensity. Each of the two stages may be implemented or programmed using the functional modules of FIG. 1 and/or programs that perform the processes of FIG. 2, FIG. 3 and as further described herein.

Occurrence

Figure 2:
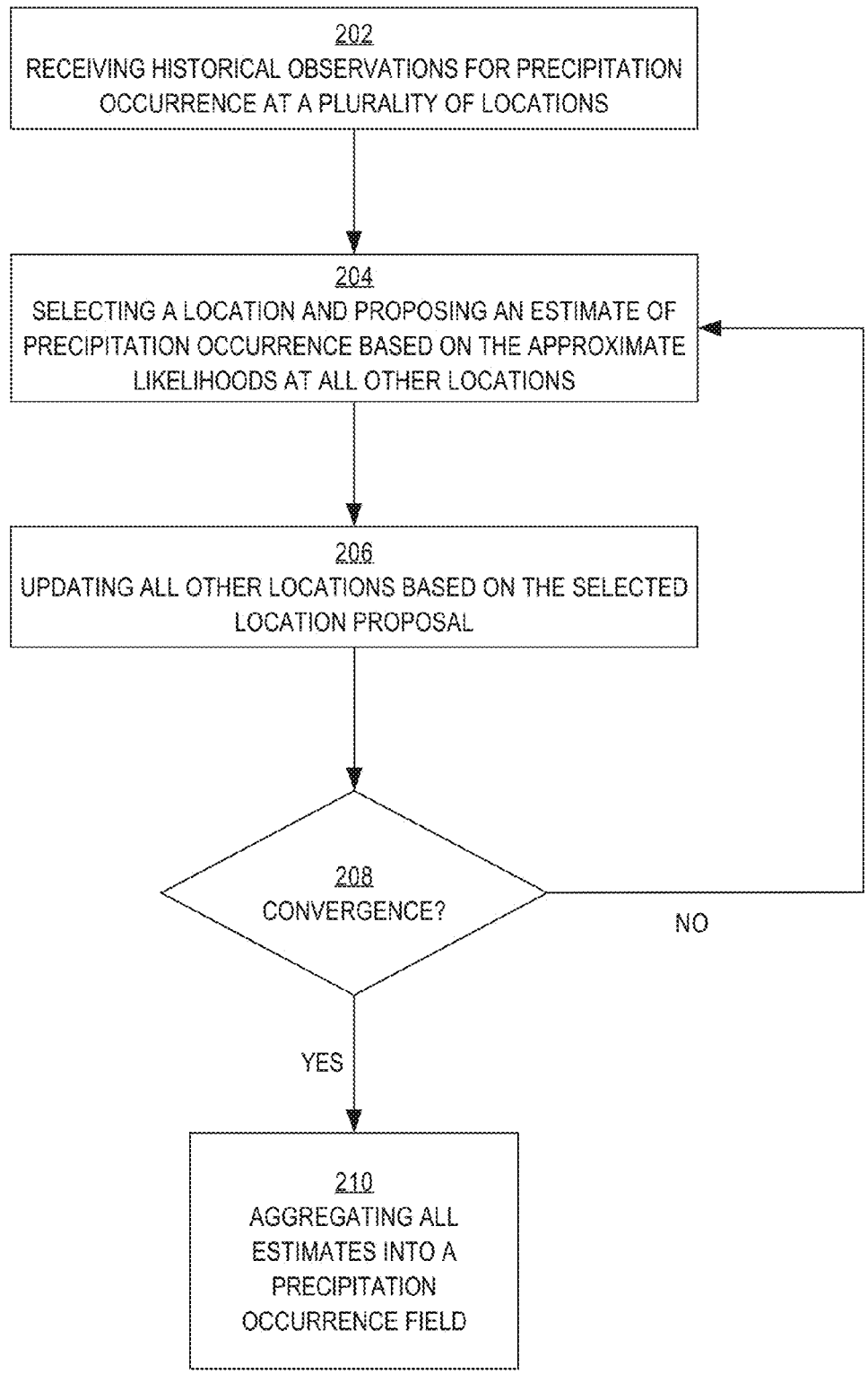
FIG. 2 illustrates a method for creating a computationally efficient precipitation occurrence field.

FIG. 2 is a flowchart of a method for creating a computationally efficient precipitation occurrence field. FIG. 2 may represent an algorithm or programming guide for programming the occurrence estimation module 126, as an example.

At step 202, occurrence estimation module 126 receives historical observations for precipitation occurrence at a plurality of locations. The historical observations may be received by querying one or more databases, repositories, or other computers that hold precipitation occurrences 104 on a historical basis, and may be received in the form of digital data records in electronic messages. The historical observations may take a binary form that represents either the occurrence of rainfall or the lack of rainfall. Alternatively, the historical observations may only take the form of precipitation intensity. Occurrence estimation module 126 may be configured or programmed to convert the intensity data values into a binary form representing either the occurrence of rainfall or the lack of rainfall. For example, all non-zero values for precipitation intensity may be converted into ones. In other embodiments, precipitation intensities are also used to determine the probability of occurrence of rainfall at various locations.

Occurrence estimation module 126 may initially determine that rainfall is dependent on a latent Gaussian process field that is parameterized by a mean vector and a covariance matrix. The smooth field may contain a threshold value, such that any values above the threshold value indicate rainfall and any values below the threshold value indicate an absence of rainfall. In an embodiment, a sigmoid response function is applied to the smooth Gaussian distribution to transform the values of the distribution to lie between zero and one, thereby creating a probabilistic estimate of the occurrence of rain. For example, if the estimate of the latent Gaussian field for San Francisco has a mean of 0.6 with a one standard deviation uncertainty of 0.1, then, after transforming the Gaussian distribution with a sigmoid function such as the cumulative Gaussian function, the estimated probability of precipitation is 73% with a 95% confidence interval of 66% to 79%. This same process may be repeated for every point within the precipitation occurrence field. The resulting values may be stored in main memory of system 120 or in records in precipitation database 136.

The probability of rainfall in one location may be largely dependent on the probability of rainfall in every other location. Rather than using, as a basis of the probability of rainfall, the observed precipitation occurrences which exist at specific locations, in an embodiment, the probability of rainfall at every other location is taken into account.

Expectation Propagation

In an embodiment, occurrence estimation module 126 is programmed using expectation propagation techniques to construct an approximation of the large scale field that describes the probability of rainfall at a given location based on all neighboring locations. Expectation propagation is an approximation to the likelihood, the probability of the observation given the model and parameters, of the underlying latent Gaussian field that depends on iteratively approximating the likelihood at each observed location.

At step 204, the approximation to the probability of precipitation occurrence at a first location is estimated, based on the probability of precipitation in the Gaussian field at the first location and the observations of precipitation at the observation locations. For example, the latent Gaussian field may be initiated at a 50% probability of precipitation at every location. At the first location, all of the observations of precipitation are used to update the estimate. As an example, if the first location is surrounded by observation posts that received an observation of precipitation, the estimation of the probability of rainfall at the first location may rise. If the first location is surrounded by observation posts that received an observation of no precipitation, the estimation of the probability of rainfall at the first location may decrease.

Figure 4A:
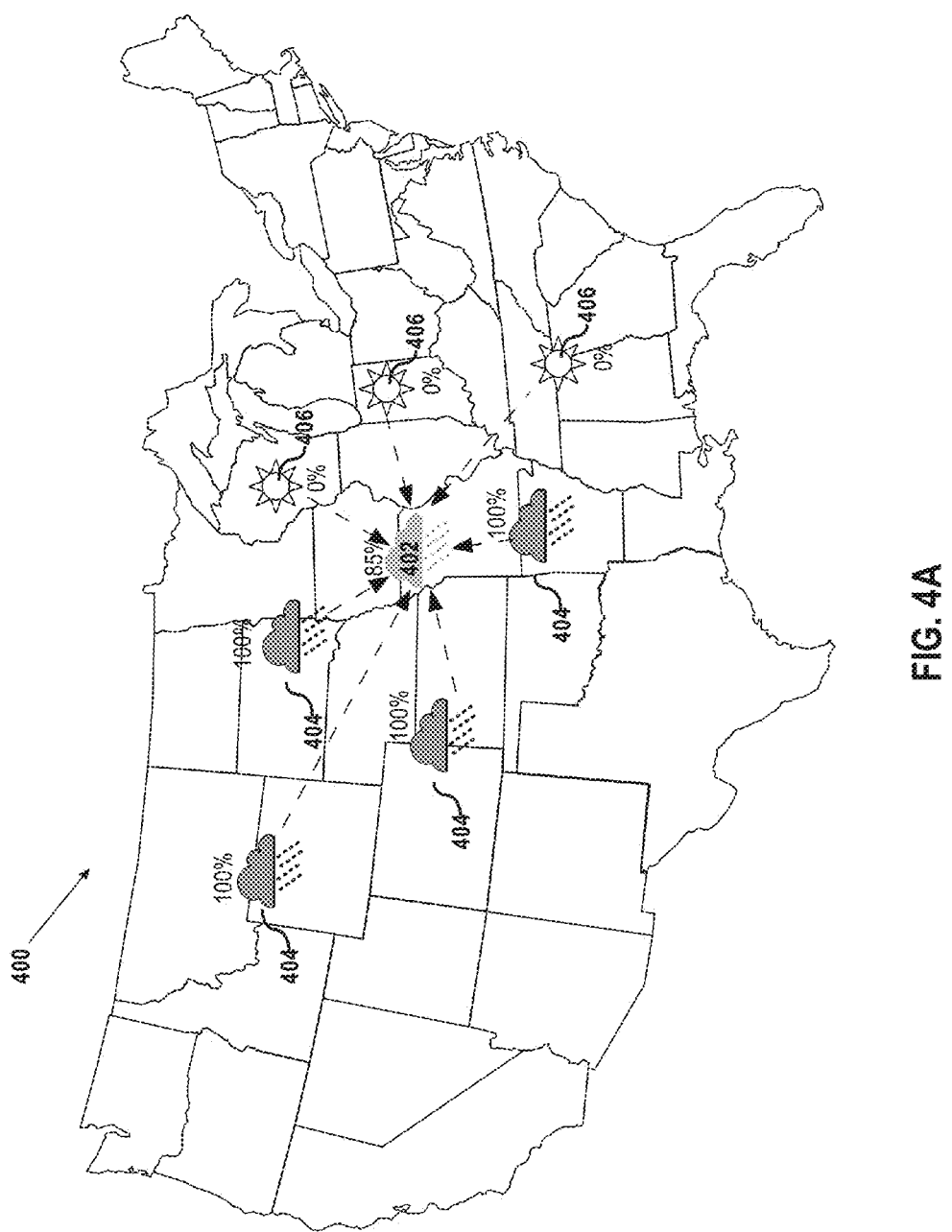
FIG. 4A depicts an example graphical map of the United States that illustrates computer-implemented techniques of using gauge locations to estimate the probability of precipitation occurrence at a first location.

FIG. 4A depicts an example of using gauge locations to estimate the probability of precipitation occurrence at a first location. A graphical map 400 of the United States, for example, may represent the geographical distribution of precipitation occurrences for which data has been received in the system 102. Map 400 contains proposal location 402, precipitation occurrence locations 404 and precipitation non-occurrence locations 406, as examples. Precipitation occurrence locations 404 represent locations that observed precipitation. Precipitation non-occurrence locations 406 represent locations that observed no precipitation. In an embodiment, the probability of precipitation at proposal location 402 is proposed based on precipitation occurrence locations 404 and precipitation non-occurrence locations 406. For example, in FIG. 4A the probability is proposed as an 85% chance of precipitation based on the relative proximities of occurrence locations 404 and non-occurrence locations 406. "Proposal," in this context, means a computed value that is digitally stored in memory at least temporarily, and possibly updated, revised or refined in other steps.

Figure 4B:
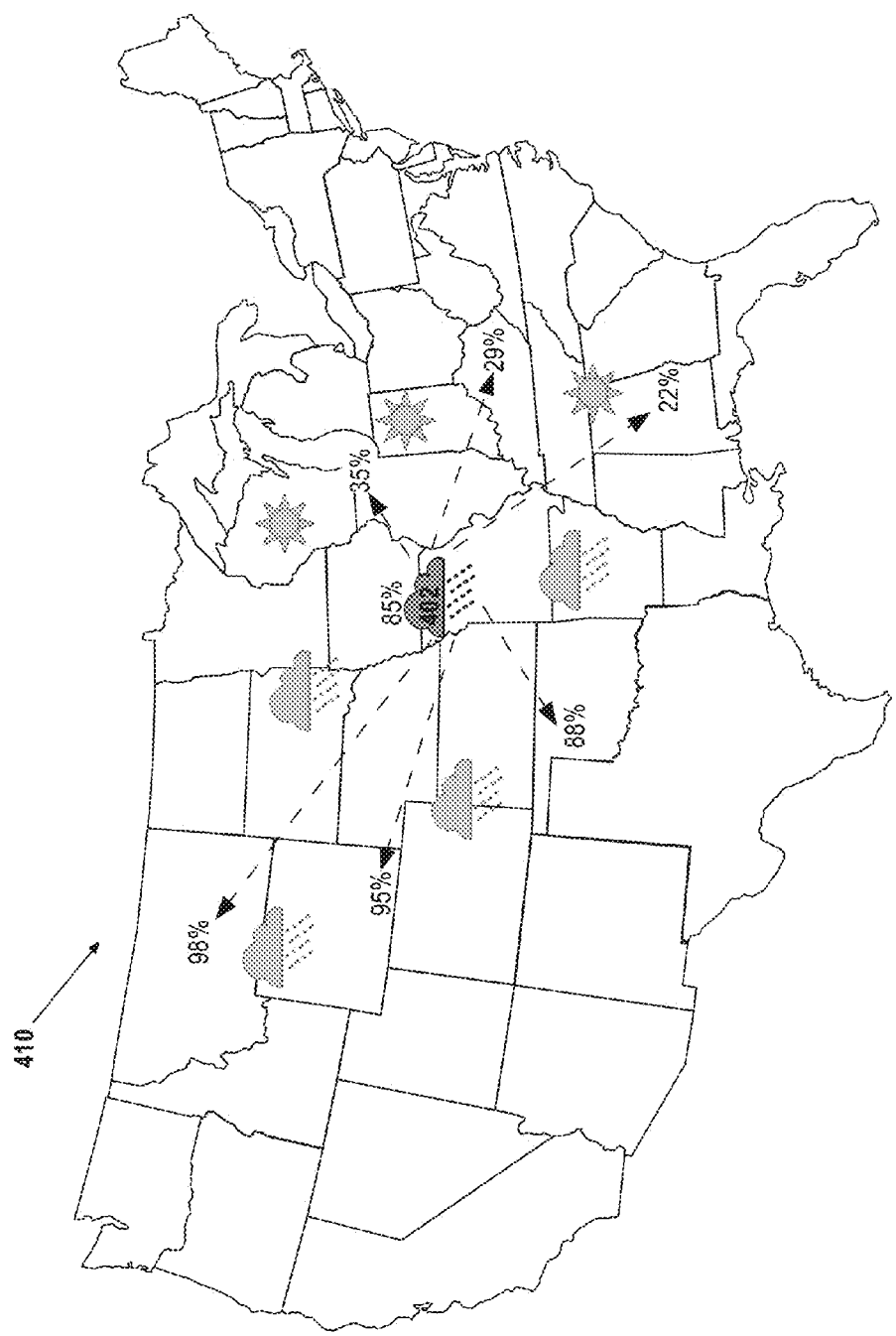
FIG. 4B depicts a second example graphical map that illustrates computer-implemented techniques of updating gauge locations based on the proposal at the first location.
Figure 4C:
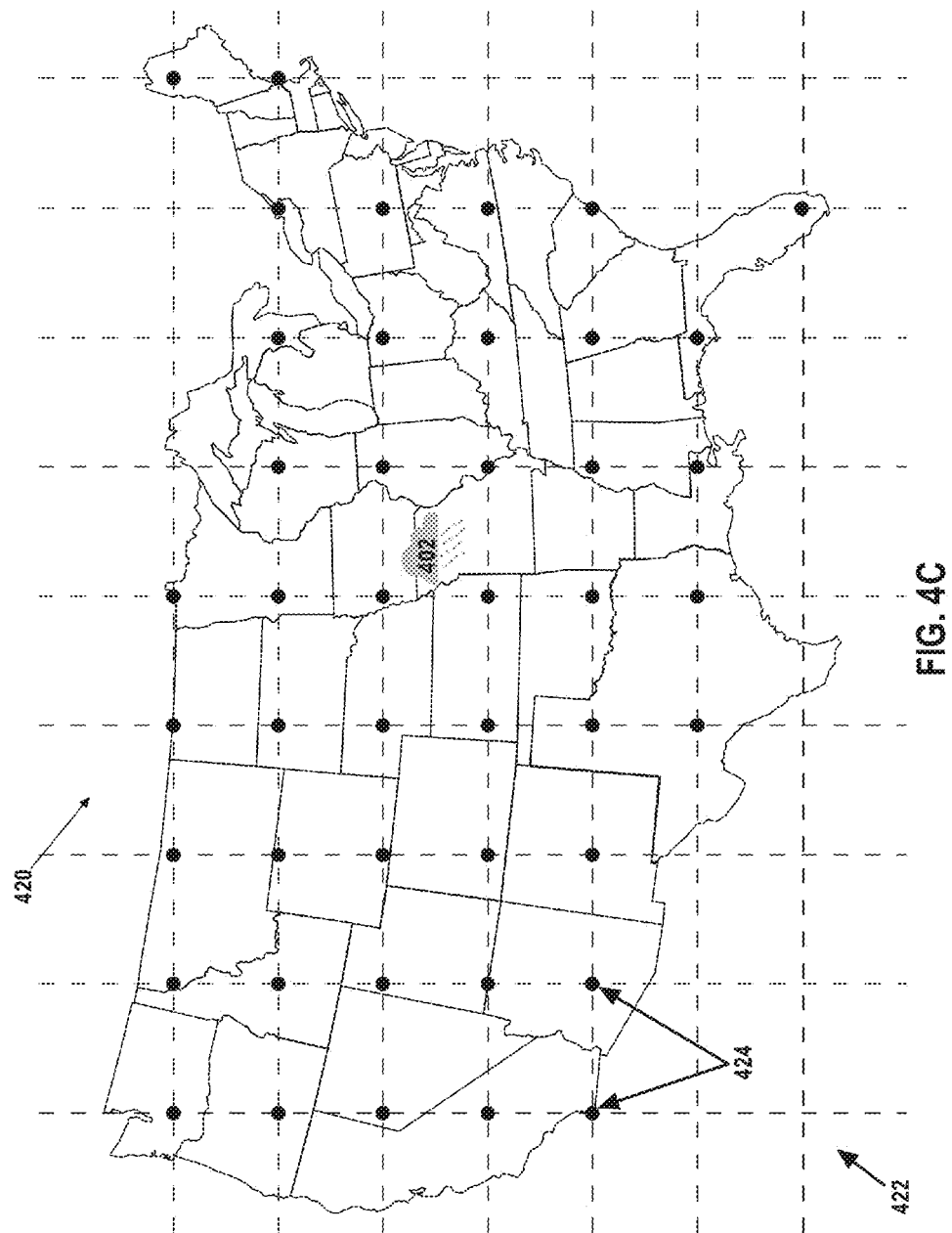
FIG. 4C depicts a third example graphical map that illustrates computer-implemented techniques of FITC expectation propagation.

FIG. 4A, FIG. 4B, and FIG. 4C depict graphical representations of maps for the purposes of illustration. In embodiments, the maps represent data in database tables and programmed manipulations. For example, each location of Map 400 may be represented by a series of values in a database representing the latitude and longitude of the location, distances between the location and all other locations, and any estimated values at the location, such as the probability of precipitation or the likely intensity of precipitation.

In an embodiment, computing the probability of occurrence of precipitation at a first location causes updates to the data values representing the probability of precipitation occurrence at the gauge locations. FIG. 4B depicts updating the data values at the gauge locations based on the proposal at the first location. Map 410 graphically illustrates geographic positions of example locations that could be represented by data in database 136 or for which data has been received in the systems 102, 120. Map 410 contains proposal location 402, precipitation occurrence locations 404 and precipitation non-occurrence locations 406. Proposal location 402 contains a probability of precipitation occurrence determined in step 204 based on precipitation occurrence locations 404 and precipitation non-occurrence locations 406. For each database record in database 136 that carries data representing an unobserved location within the latent Gaussian field, the proposed probability at proposal location 402 is used to update the probability of occurrence in that record of the database. By updating the data values at all locations represented in the database with each proposal, the data values at the locations represented in the database begin to resemble the actual underlying probability field.

In an embodiment, the first location is a location that has a rain gauge measurement represented in the database. Occurrence estimation module 126 may ignore the gauge measurement of the first location in determining an initial proposal for the probability of precipitation at the first location. In this manner, occurrence estimation module 126 may shape the latent field to represent the probability of precipitation at all points based on the observations at discrete locations.

Referring again to FIG. 2, at step 206, occurrence estimation module 126 updates all of the other estimates of precipitation based on the current proposal of precipitation. In the early stages of the process described in step 206, the proposed probability of precipitation at the first locations may be inaccurate as the method has not reached convergence. With each proposal, occurrence estimation module 126 may return to and update the previous proposals based on the new proposals at the new locations. Over time, the proposals of the probability of precipitation occurrence at the locations with observations will gradually converge to a model that accurately describes the probability of precipitation occurrence at those locations.

At step 208, occurrence estimation module 126 determines if the method has reached convergence. The method reaches convergence when the current iterations of updating no longer lead to significant changes in the product of the values of the approximate factors. A threshold value may be set as a minimum value for updates to the approximate values. For example, if a change in the logarithm of the product of the values of the approximate factors falls below 0.001, occurrence estimation module 126 may determine that convergence has been reached. Occurrence estimation module 126 may estimate and update values for each location through a plurality of iterations before convergence is reached.

At step 210, occurrence estimation module 126 aggregates all of the proposals into a precipitation occurrence field. The precipitation occurrence field indicates the probability of precipitation occurrence across a large scale region for a specific period of time. For example, if the gauge measurements display the observed rainfall over a day, the precipitation occurrence field would indicate the probability of precipitation occurrence across the large scale region for that day. Thus, the above described method can be used to create precipitation occurrence fields that cover small periods of time such as hours or large periods of time such as months or years depending on the received data. "Large scale," in this context, typically means covering a large geographic area at a high granularity, such that the region contains a substantial number of locations. For example, a large scale region may comprise the continental United States with locations estimated at two mile intervals.

Fully Independent Training Conditional Approximation

In an embodiment, propagation of expectation using a fully independent training conditional (FITC) assumption creates a second level of approximation. Generally, each point in the precipitation occurrence field is dependent on all other points in the field. In expectation propagation, each location with an observation is proposed independently and used to cause updates to each other location with an observation. In FITC expectation propagation, the probability of precipitation at each location, including locations with observations and locations without observations, is presumed to be dependent only on a smaller number of defined locations, called "inducing locations". By assuming that each of the locations with observations is dependent only on the inducing locations, the rank of the covariance matrix is reduced to the number of inducing points, thus reducing the complexity of the calculations required for the model.

FIG. 4C depicts an example graphical map that may illustrate the use of FITC expectation propagation. Points on the map represent data stored in the database. Map 420 contains proposal location 402, coarse grid 422, and coarse grid locations 424, which correspond to the inducing locations. In the embodiment depicted in FIG. 4C, coarse grid 422 is overlaid on map 420 to provide coarse grid locations 424. The grid 422 and locations 424 are represented in the system by stored digital data or using programming techniques that cause processing based upon the grid and locations. The probability of precipitation occurrence at each location is presumed to be dependent only on the probability of precipitation occurrence at each of the coarse grid locations 424.

Referring again to FIG. 2, at step 204, an estimate of the probability of precipitation occurrence at proposal location 402 is proposed. Instead of updating prior proposals, as in step 206, occurrence estimation module updates the estimates for the probability of precipitation occurrence at each of coarse grid locations 424 in a representation in memory or the database. Occurrence estimation module 126 may then propose the probability of precipitation occurrence at a second location. The proposal at the second location may be used to update a representation of the coarse grid in memory or the database. In an embodiment, occurrence estimation module 126 may apply expectation propagation without the FITC approximation to locations with observations. This method may continue until the increase in the likelihood with each iteration drops below a specific threshold.

In an embodiment, using FITC expectation propagation involves creating a trade-off between accuracy and computational efficiency. For example, a coarse grid that is designed to include three thousand locations would have more variation per thousand km than a coarse field that is designed to include one hundred locations. On the other hand, a coarse grid with one hundred locations would require less computation by occurrence estimation module 126 because the rank of the covariance matrix is reduced.

In an embodiment, a version of expectation propagation is chosen by occurrence estimation module 126 based on minimum requirements for computational efficiency or accuracy. For example, weather computing system 120 may determine that a maximum error for the probability of precipitation occurrence on a specific day may not exceed 4% to allow for an accurate weather forecast. Occurrence estimation module 126 may determine that a coarse grid with one hundred and fifty nine locations is required to reduce the error to 4%. Occurrence estimation module may thus use a coarse grid with one hundred fifty nine locations to maximize computational efficiency while still meeting the accuracy requirements. In another example, weather computing system 120 may determine that an estimate is required within a set period of time or that a maximum amount of memory may be devoted to creating an estimate. Occurrence estimation module may then determine that the most accurate estimate within the computational efficiency requirements involves using, at maximum, a grid of two thousand six hundred fifty three locations. Occurrence estimation module 126 may then use the grid of two thousand six hundred and fifty three locations in order to maximize the accuracy of the estimated precipitation occurrence field within the computational constraints.

In other embodiments, to determine which version of expectation propagation to use, accuracy may be sacrificed for computational efficiency until occurrence estimation module 126 determines that it has reached a level of diminishing returns. Occurrence estimation module 126 may be programmed or configured with a set tolerance for diminishing returns. Thus, if occurrence estimation module 126 receives a range for allowed accuracy and a range for allowed computational efficiency, occurrence estimation module 126 may determine a point of diminishing returns that is encompassed in both ranges. Likewise, if occurrence estimation module 126 receives a request to prioritize accuracy over efficiency, occurrence estimation module 126 may increase the number of points within the coarse grid until it reaches a point of diminishing returns below the set tolerance.

Precipitation Intensity

Figure 3:
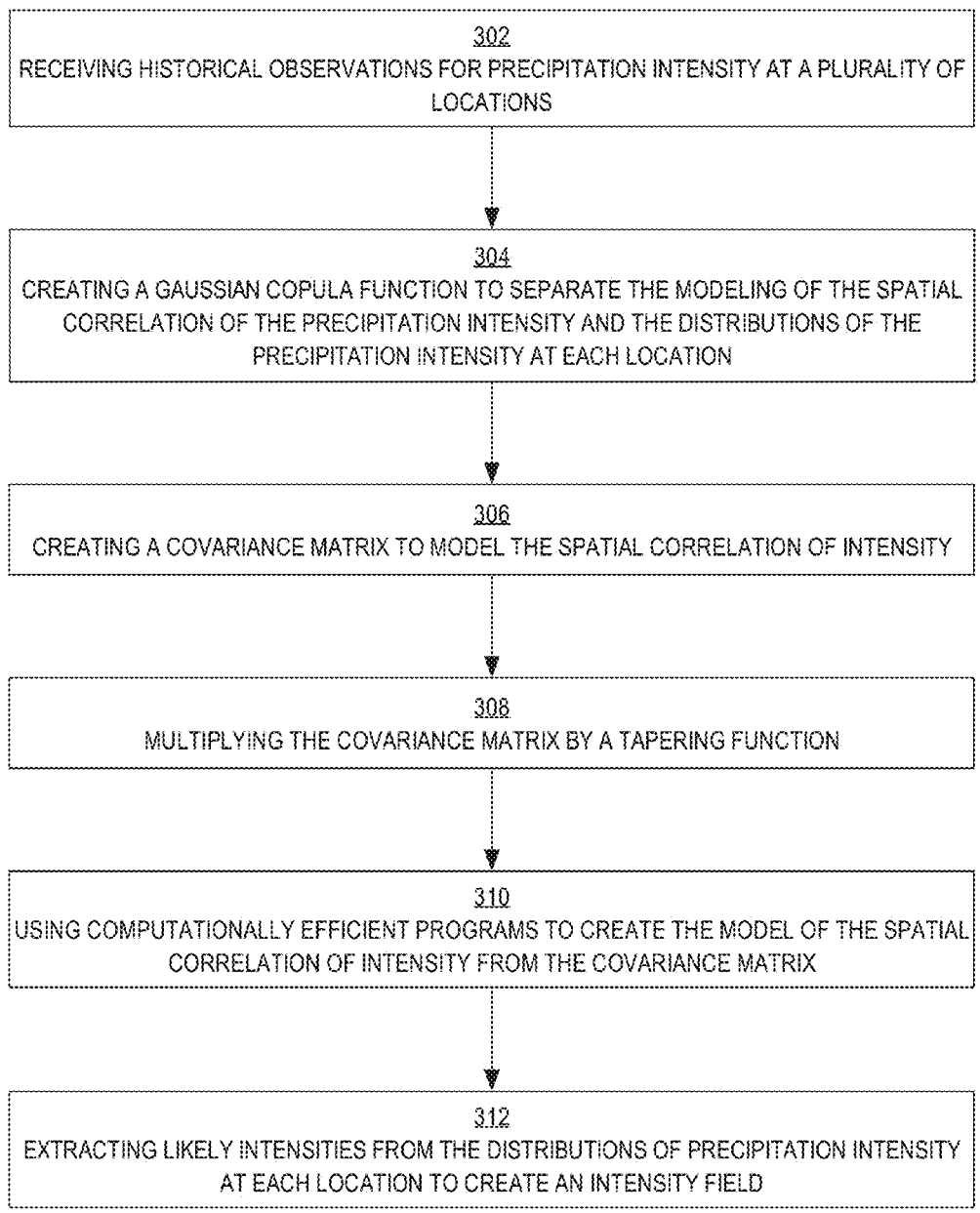
FIG. 3 illustrates a method for creating a computationally efficient precipitation intensity field.

FIG. 3 is a flowchart of a sample method for creating a computationally efficient precipitation intensity field.

At step 302, historical observations are received for precipitation intensity at a plurality of locations. For example, intensity estimation module 128 may receive precipitation intensities 106 from precipitation server computer 102 relating to measurements taken by one or more gauges at the plurality of locations. Precipitation intensities 106 may include an amount of rain received at a specific location for a specific time period, such as three centimeters of rain within fourteen hours. The precipitation intensities 106 may be received electronically via queries, messages, or other data retrieval operations and stored in records, columns or tables in memory or the database 136.

At step 304, a spatial correlation of precipitation is computed. For example, using the weather computer 120, a Gaussian copula function, as described below, may be used to model the spatial correlation of precipitation while maintaining the distribution of the likely precipitation intensity at each location.

At step 306, the spatial correlation of intensity is computed. For example, a Gaussian field with a covariance function may be used to represent the precipitation intensity across the entire map. As the field is presumed to vary spatially with an additional dependence on elevation, a computational model may use as covariates latitude, longitude, and altitude. Covariate matrices may be used to model the effects of the intensities of precipitation at all other locations as a function of distance from a single location. Thus, for each location the likely precipitation intensity is dependent on the precipitation intensity of the neighboring locations.

The Gaussian copula function allows the modeling of the spatial structure of the precipitation intensity field to be separated from the modeling of the intensity at a particular location. For example, a Gaussian field is suitable for modeling the spatial correlation among points of the precipitation intensity field. However, a Gaussian distribution is not appropriate for modeling the intensity at a particular point since intensity cannot be negative and the probability of small amounts of rain is much higher than the probability of large amounts of rain. Thus, distributions that rule out negative intensities and increase the probabilities for low values and decrease the probabilities for high values, such as a gamma distribution, may be more appropriate to model intensity.

In an embodiment, the underlying field for the precipitation intensity model is observable and estimates the likely intensity of rainfall at each location. The probability function for the precipitation intensity model is analytically tractable; therefore, in an embodiment, an expectation propagation approximation step, as used for the occurrence model, is not used in the precipitation intensity model.

Tapering

In an embodiment, determining the likely precipitation intensities at each location involves the inversion of the covariance matrix. Because of the large number of points in the covariance matrix, each inversion adds complexity to the calculation. During the estimations of precipitation intensity, the covariate matrices require multiple inversions, creating even greater complexity.

In an embodiment, a tapering function, such as the first order Wendland function, may be used to simplify the covariance matrix. The tapering function may create a specified distance beyond which the intensity of precipitation is presumed to be independent. The tapering function causes values past the specified distance to be converted to zeros while preserving the positive definiteness of the matrix. For example, a tapering function may be chosen that assumes that the precipitation intensity at any location beyond three hundred fourteen kilometers from the estimation location does not affect the estimation location.

At step 308, the covariance matrix is multiplied by the tapering function. Multiplying the covariance matrix by the tapering function creates a sparsely populated matrix where a large number of values are reduced to zeros. In the above example, the values representing the effects of locations beyond three hundred and fourteen kilometers would be replaced by zero while the remaining values would be modified by the tapering function.

At step 310, a model of the spatial correlation of intensity is created. For example, intensity estimation module 128 may use computationally efficient algorithms to model the spatial correlation of intensity through repeated inversions of the covariance matrix. Inverting a large matrix can be computationally inefficient, but functions exist that can efficiently invert a matrix that is mostly filled with zeros. By introducing sparsity into the matrix, intensity estimation module 128 creates matrices that can be easily inverted using computationally efficient functions, such as sparse Cholesky decompositions.

At step 312, an intensity field is created. For example, intensity estimation module 128 may extract likely intensities from the distributions at each location to create an intensity field. At each individual point, a value for the intensity of precipitation is drawn from a gamma distribution whose parameters are inferred from the Gaussian spatial model. Standard samplers, such as emcee or univariate slice samplers, may be employed to sample from the probability distributions of parameters of the gamma distribution and the Gaussian spatial model. The gamma distribution is then used to create probabilistic estimates for the intensity of precipitation at a given point.

In an embodiment, the specified distance for the tapering function is determined by intensity estimation module 128 based on one or more factors. Intensity estimation module 128 may select a specified distance based on location, time of year, computational efficiency, and/or surrounding elevation. For example, intensity estimation module 128 may determine that the spatial correlation of precipitation intensity in Pittsburgh is relatively low while the spatial correlation of precipitation intensity in Mississippi is relatively high. A larger specified distance may be applied in Mississippi than in Pittsburgh. As another example, the spatial correlation length may increase in winter and decrease in summer. Thus, a larger value for the specified distance may be chosen in January and a lower value may be chosen in May. In another example, intensity estimation module 128 may select a lower specified distance in order to increase computational efficiency at the cost of accuracy. Similar to the trade-off with expectation propagation, intensity estimation module 128 may make the trade-off based on requirements for a level of accuracy or computational efficiency, based on maximizing a level of accuracy or computational efficiency up to a point of diminishing returns, and/or based on a request to balance the accuracy and computational efficiency within specified ranges.

In an embodiment, FITC may be additionally applied to the intensity estimation to further increase computation efficiency. As with FITC expectation propagation, the application of FITC to the intensity estimates may involve overlaying a coarse grid over the map. The intensity of precipitation at each location may be presumed to be dependent only on the various points of the coarse grid, thereby decreasing the number of values in the covariance matrix. Unlike with expectation propagation, the underlying intensity field is observable for the intensity estimation. Thus, the coarse grid may not be updated after each measurement. Additionally, the coarse grid may include a subset of the gauge locations which correspond to the underlying intensity field. Variations of FITC may be applied in a similar manner with the intensity estimation as with the occurrence estimation. Thus, a grid with a large number of locations may be used to increase accuracy while a grid with a small number of locations may be used to increase computational efficiency.

In an embodiment, FITC is combined with the tapering function to further increase computational efficiency. The application of FITC may involve creating a coarse grid with a limited number of locations while the application of the tapering function may zero out points of the coarse grid that are beyond a specified distance from the estimation location. For example, a coarse grid overlaid on the map may contain nine hundred twenty six locations. Application of a tapering function to the coarse grid may zero out all but fifty three locations. In additional embodiments, a coarse grid may be applied only to the area within the specified distance. Application of the tapering function and FITC may be based on a trade-off between accuracy and computation efficiency as described above. Additionally, intensity estimation module 128 may dynamically switch between increasing/decreasing the specified distance of the tapering function and increasing/decreasing the number of points in the coarse grid in order to maximize gains while minimizing loss. For example, intensity estimation module 128 may receive a request to maximize accuracy over computational efficiency up to a specific point, such as maximum memory requirements. Intensity estimation module 128 may begin by increasing the number of points in the coarse grid until it determines that an increase in the specified distance for the tapering function would add greater accuracy while decreasing the computational efficiency of the system at a lower rate. Intensity estimation module 128 may then increase the specified distance until it determines that increasing the number of points in the coarse grid would be more efficient.

Combined Fields

In an embodiment, climate estimation module 124 receives samples of the precipitation occurrence field from occurrence estimation module 126 and precipitation intensity field from intensity estimation module 128. Climate estimation module 124 may combine fields for overlapping time periods to create final precipitation fields. As described above, the samples of the precipitation occurrence field, after being transformed to the range 0 to 1 with a sigmoid function, indicate the probability of rainfall occurrence at all locations. The samples of the precipitation occurrence field may be used as a mask when applied to the samples of the precipitation intensity field. Thus, any locations for which the sample from the precipitation intensity field indicates zero rainfall may have the intensities reduced to zero in the corresponding sample from the precipitation intensity field.

In an embodiment, multiple final precipitation fields are created for each time period based on uncertainties in the estimate of precipitation occurrence and intensity.

In an embodiment, the final precipitation fields include estimates of uncertainty for the intensity of precipitation. Where the occurrence of precipitation includes little uncertainty, the total uncertainty may comprise only the uncertainties of precipitation intensity captured by the precipitation intensity fields. Where the occurrence or absence of precipitation contains significant uncertainty, the total uncertainty may include a combination of the uncertainties in the precipitation intensity fields with an added uncertainty created by a probability that the actual intensity of precipitation is zero.

As the occurrence fields and intensity fields are modeled separately, combining the two fields may sometimes create physically unrealistic regions of high precipitation intensity surrounded by regions of no precipitation occurrence. For example, gauges that report an absence of precipitation may be used to constrain the precipitation occurrence module, but may not be used to constrain the models of precipitation intensity because there is no intensity value. In some embodiments, instead of removing the gauges that include no rain from the estimation of precipitation intensity, gauges that include no rain are treated as including a trace amount of rain, thus constraining neighboring locations to estimate a smaller intensity of precipitation. This reduces the risk of isolated locations with high intensities of precipitation surrounded by locations with no precipitation.

Data Usage

The two-stage modeling approach described above creates estimated precipitation fields using observed data, such as gauge data. The resultant data may be displayed in multiple formats. A first format includes point estimates for precipitation at given locations. Climate estimation module 124 may produce distributions of rainfall at given locations in response to a request for data at the given locations. For example, agronomic model module 132 or weather forecast module 134 may request probabilistic data at a specific location in order to create agronomic models or weather forecasts. Multiple point estimates for precipitation at a given location may be aggregated into a single estimate. For example, multiple distributions comprising estimates of precipitation for a single day may be aggregated into an estimate of received rainfall for an entire year.

Climate estimation module 124 may also produce physical spatial statistics, such as precipitation estimates across a spatial domain. The physical spatial statistics may be displayed as a map with various rainfall data displayed across the map. For example, a legend may display a range of colors representing rainfall intensities at each location. Multiple maps for a period of time may be aggregated into a single map. For example, multiple maps displaying precipitation for a single day may be aggregated into one map that displays precipitation over a 30-day period. Multiple maps may also be aggregated into a series of images that can be displayed sequentially. The sequential display may be useful in depicting changes in precipitation over a period of time. The maps may also be used to track or record data from specific weather events, such as storms or droughts. Information on how storms or droughts have evolved over time may be obtained by viewing the various maps of precipitation intensities.

The two-stage modeling approach described above allows climate estimation module 124 to plausibly fill in data where data is unavailable. Data may be unavailable for certain locations where satellite or radar data is unavailable. Filling in data at these locations may allow for the creation of better analysis of historical weather conditions, better weather forecasts, or better agronomic models. Additionally, historical data for an entire field may only be available for a brief period of time. The models described above may be used to create historical estimates for precipitation during periods of time where precipitation data is only available at gauge locations. The historical data may be used to analyze changing weather patterns, predict future weather, or describe major weather events.

Weather Forecasts

In an embodiment, climate estimation module 124 sends the final estimates for precipitation intensity and occurrence to weather forecast module 134. Weather forecast module 134 may use the final estimates for precipitation intensity and occurrence to create weather forecasts. For example, weather forecast module 134 may determine one or more weather patterns associated with precipitation intensity in the final estimates. The weather patterns may be applied to similar initial conditions to create precipitation predictions, such as in Non-Provisional application Ser. No. 14/681,886, the entire contents of which are incorporated by reference as if fully set forth herein.

Additionally, historical weather information may be used to correct forecasting methods. For example, a specific forecasting method may contain past predictions for precipitation on one or more days. The final estimates for the one or more days may be compared to the forecasts for the one or more days to determine if the forecasts tend to be high or low. The difference between precipitation forecasts and precipitation estimates may be used to correct current precipitation forecasts. For example, if a specific forecasting method tends to overestimate precipitation during a certain time of year, the past differences between the final estimates and the predictions may be used to modify the precipitation predictions for a current or future forecast.

In an embodiment, weather computing system 120 sends weather forecasts 152 to mobile computing device 154. In other embodiments, weather computing system 120 creates recommendations using weather forecasts 152 and sends the recommendations to mobile computing device 154. Weather computing system 120 may also store weather forecasts 152 in memory. Stored weather forecasts may later be used to improve methods used by weather forecast module 134 or to rate the various modeling methods. Additionally, weather forecast module 134 may send weather forecasts to agronomic model module 132 to be used in creating agronomic models.

Agronomic Models

In an embodiment, climate estimation module 124 sends the final estimates for precipitation intensity and occurrence to agronomic model module 132. Agronomic model module 132 may use the final estimates for precipitation intensity and occurrence to create an agronomic model. Additionally, agronomic model module 132 may use weather forecasts received from weather forecast module 134 to create the agronomic models. In an embodiment, an agronomic model is a data structure in memory of weather computing system 120 that contains location and crop information for one or more fields. An agronomic model may also contain agronomic factors which describe conditions which may affect the growth of one or more crops on a field. Additionally, an agronomic model may contain recommendations based on agronomic factors such as crop recommendations, watering recommendations, planting recommendations, and harvesting recommendations. The agronomic factors may also be used to estimate one or more crop related results, such as agronomic yield. The agronomic yield of a crop is an estimate of quantity of the crop that is produced.

In an embodiment, weather computing system 120 uses the precipitation estimates to create an agronomic model in memory or in persistent storage in response to a request from mobile computing device 154 for an agronomic model. In other embodiments, weather computing system 120 receives a request from a third party for an agronomic model. For example, an insurance company may request an agronomic model for an insured customer's field to determine the risks associated with the crop planted by the customer. In another example, an application server may send a request to weather computing system 120 to create an agronomic model for a specific user's field. Alternatively, weather computing system 120 may generate agronomic models 150 periodically. Weather computing system 120 may also generate agronomic models 150 in response to receiving updated precipitation observations or in response to creating updated precipitation estimates.

Weather forecasts received from weather forecast module 134 may be factored into agronomic models 150 by agronomic model module 132. The amount of water a crop receives may affect the development cycle of the crop. Agronomic model module 132 may estimate the amount of water a crop needs and determine the likely amount of water the crop will receive from natural precipitation based on weather forecasts. Agronomic model module 132 may use this information to affect the estimate for agronomic yield. Additionally, agronomic model module 132 may use the weather forecasts to generate recommendations for farmers. For example, agronomic model module 132 may recommend that a crop is not watered on a day that has a high probability of large amounts of precipitation. Alternatively, agronomic model module 132 may recommend that a crop receives extra water if the chances of precipitation are extremely low for the foreseeable future.

In an embodiment, uncertainties in the estimates are propagated into the agronomic models and weather forecasts. For example if the estimated precipitation for a particular field on a particular day contains an uncertainty regarding how much water the field has received, the agronomic model for the particular field may include an uncertainty for how much water the crop has received. Additionally, if a precipitation estimate contains an uncertainty regarding an increase in precipitation over a period of time, the weather forecasts may include the uncertainty in predicting similar increases. The uncertainties in the weather forecast may be propagated into the agronomic models as well. For example, the uncertainty in the amount of water a crop has received and the uncertainty in the amount of water a crop will receive may be propagated to watering and planting recommendations, such that a recommendation is less or more definite based on the uncertainties in the past and future precipitation.

In an embodiment, weather computing system 120 sends agronomic models 150 to mobile computing device 154. In other embodiments, weather computing system 120 creates recommendations using agronomic models 150 and sends the recommendations to mobile computing device 154. In some embodiments, climatology computing system may generate alerts based on information in agronomic models 150. For example, weather computing system 120 may generate an alert to be sent to mobile computing device 154 in response to determining that a specific crop is about to reach the end of its development based on the estimated number of growing degree days since the crop was planted. Weather computing system 120 may also store agronomic models 150 in memory. Stored agronomic models may later be used to improve methods used by agronomic model module 132 or to rate the various modeling methods.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
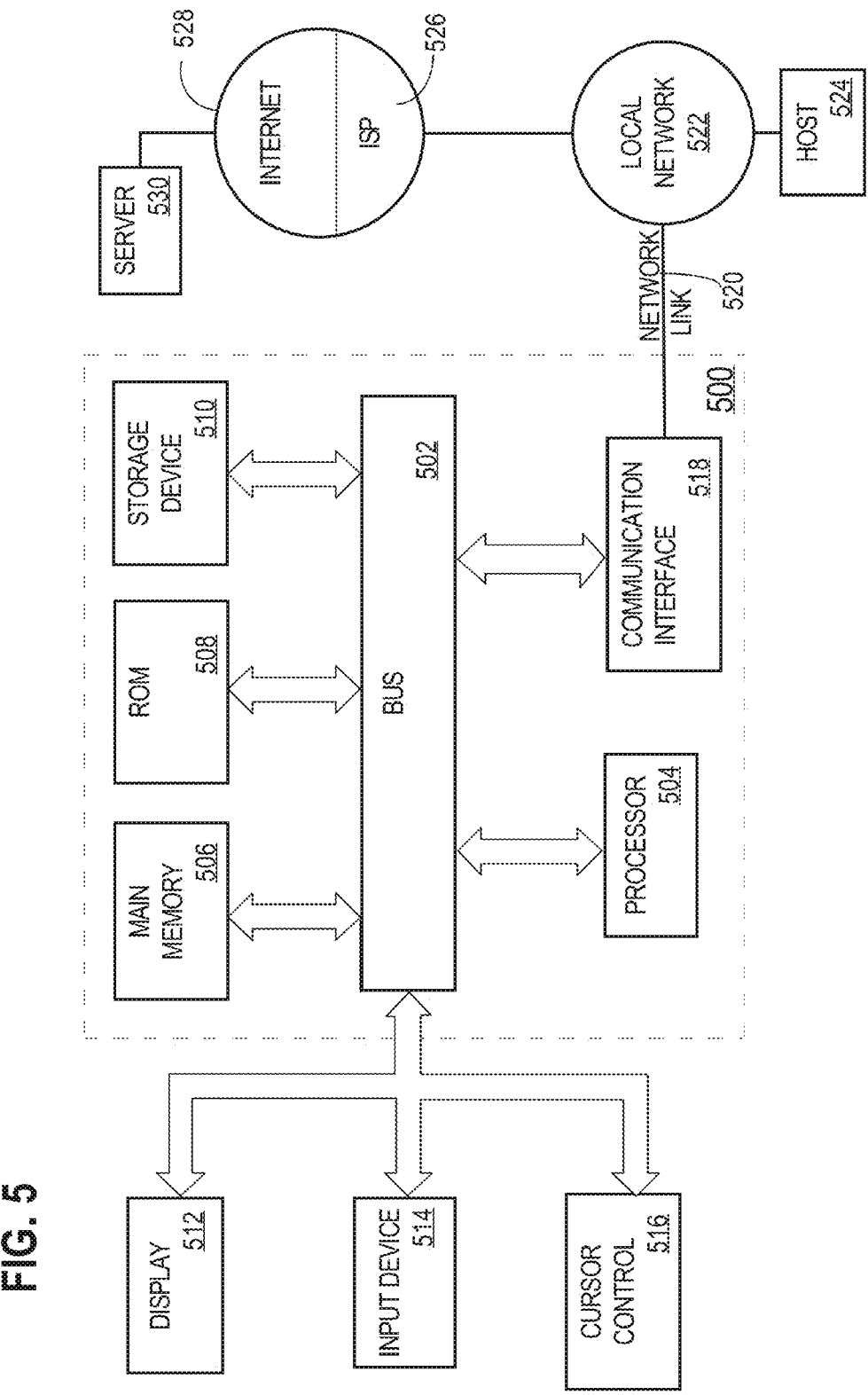
FIG. 5 illustrates a computer system upon which embodiments may be implemented.

For example, FIG. 5 is a block diagram that illustrates a computer system 500 upon which embodiments may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis, such as x) and a second axis, such as y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Benefits of Certain Embodiments

Using the techniques described herein, a computer can deliver estimates of precipitation and associated uncertainties in locations lacking precise precipitation data or for periods of time when precipitation data is unavailable. For example, the techniques herein can deliver probabilistic precipitation estimates at a field location level based only on gauge measurements, which otherwise may not be available from public and/or commercial data sources. The processes may be used in computer implementations to deliver to a user computing device, in response to a request, probabilistic estimates of precipitation values at growing fields or other locations even when observed precipitation values are for much less granular areas or locations, are incomplete, are missing, and/or are unavailable. Consequently, the performance of the end user computing device may be improved because device applications may receive and use data that otherwise would not be available, avoid errors that are introduced by using data that is incomplete, and/or propagate uncertainty about precipitation occurrence and intensity to improve decision making.

EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
    receiving, over a computer network, one or more digital precipitation records comprising a plurality of digital data values representing an occurrence of precipitation at a first plurality of locations and an intensity of precipitation at the first plurality of locations;
    using digitally programmed logic of a digital electronic weather computer, creating and storing in a precipitation database one or more precipitation occurrence fields by:
        repeating the following steps for each location of a second plurality of locations for each of any number of iterations:
            a) selecting a particular location of the second plurality of locations;
            b) creating a probabilistic estimate of the occurrence of precipitation at the particular location based on the occurrences of precipitation at the first plurality of locations;
            c) if it is not a first iteration of the number of iterations, updating one or more probabilistic estimates of the occurrence of precipitation at one or more other locations of the second plurality of locations based on the probabilistic estimate of the occurrence of precipitation at the particular location;
        determining whether, during a particular iteration, one or more values changed by more than a threshold value;
        in response to determining that one or more values changed by more than the threshold value, performing a next iteration;
        in response to determining that the one or more values did not change by more than the threshold value, aggregating the probabilistic estimates of the occurrence of precipitation at the second plurality of locations into the one or more precipitation occurrence fields;
    using digitally programmed logic of the weather computer, creating and storing in the precipitation database one or more precipitation intensity fields by:
        using the digital data values representing intensity of precipitation at the first plurality of locations, creating and storing a model of spatial correlation of intensity of precipitation for the second plurality of locations;
        for each location of the second plurality of locations:
            creating and storing one or more distributions of the intensity of precipitation at the location, including digitally constraining the distributions by the intensity of precipitation at the one or more other locations of the second plurality of locations and/or the data values representing the intensity of precipitation at the first plurality of locations;

extracting one or more data values representing probabilistic estimates for intensity based on the one or more data values that describe relationships and the one or more distributions of the intensity of precipitation at the location;

aggregating the extracted one or more data values into the one or more precipitation intensity fields;

using digitally programmed logic, creating and digitally storing final estimates for precipitation occurrence and intensity at one or more locations of the second plurality of locations based on the one or more precipitation occurrence fields and the one or more precipitation intensity fields.

2. The method of claim 1 wherein creating and storing the one or more precipitation occurrence fields further comprises:

creating, in digital memory of the weather computer, a coarse grid representing the occurrence of precipitation at generalized locations of the second plurality of locations;

creating the probabilistic estimates of the occurrence of precipitation at each of the second plurality of locations based, at least in part, on estimated occurrences from one or more of the generalized locations represented by the coarse grid.

3. The method of claim 1 further comprising generating and storing one or more agronomic models in digital memory of the weather computer based at least in part on the final estimates for precipitation occurrence and intensity.

4. The method of claim 3 wherein the final estimates for precipitation occurrence and intensity include one or more estimates of uncertainty, the method further comprising modifying the agronomic models and storing modified agronomic models in the digital memory by propagating the one or more estimates of uncertainty into the one or more agronomic models.

5. The method of claim 1 further comprising:

creating one or more elevation dependent variables in digital memory of the weather computer;

factoring in the one or more elevation dependent variables in creating the one or more precipitation occurrence fields;

factoring in the one or more elevation dependent variables in creating the one or more precipitation intensity fields.

6. The method of claim 1 wherein extracting one or more data values representing probabilistic estimates for intensity comprises:

sampling values from the one or more distributions of the intensity of precipitation at each of the locations for one or more parameters;

computing one or more likely intensities for each of the locations of the second plurality of locations based on the one or more parameters and on one or more covariates.

7. The method of claim 6 wherein the one or more covariates include latitude, longitude, and altitude.

8. The method of claim 6 wherein computing the one or more likely intensities comprises:

creating one or more covariance matrices that includes distances of each of the second plurality of locations to each of the first plurality of locations;

applying a tapering function to the one or more covariance matrices to create one or more computationally efficient covariance matrices;

calculating the one or more likely intensities using the one or more computationally efficient covariance matrices.

9. The method of claim 1 further comprising digitally augmenting the one or more precipitation intensity fields using the one or more precipitation occurrence fields.

10. The method of claim 1 further comprising:

using digitally programmed logic, generating and displaying one or more weather forecasts based, at least in part, on the final estimates for precipitation occurrence and intensity.

11. One or more non-transitory computer readable media storing instructions which, when executed by one or more computing devices, cause performance of:

receiving, over a computer network, one or more digital precipitation records comprising a plurality of digital data values representing an occurrence of precipitation at a first plurality of locations and an intensity of precipitation at the first plurality of locations;

using digitally programmed logic of a digital electronic weather computer, creating and storing in a precipitation database one or more precipitation occurrence fields by:

repeating the following steps for each location of a second plurality of locations for each of any number of iterations:

a) selecting a particular location of the second plurality of locations;

b) creating a probabilistic estimate of the occurrence of precipitation at the particular location based on the occurrences of precipitation at the first plurality of locations;

c) if it is not a first iteration of the number of iterations, updating one or more probabilistic estimates of the occurrence of precipitation at first plurality of locations and at the one or more other locations of the second plurality of locations based on the probabilistic estimate of the occurrence of precipitation at the particular location;

determining whether, during a particular iteration, one or more values changed by more than a threshold value;

in response to determining that one or more values changed by more than the threshold value, performing a next iteration;

in response to determining that the one or more values did not change by more than the threshold value, aggregating the probabilistic estimates of the occurrence of precipitation at the second plurality of locations into the one or more precipitation occurrence fields;

using digitally programmed logic of the weather computer, creating and storing in the precipitation database one or more precipitation intensity fields by:

using the digital data values representing intensity of precipitation at the first plurality of locations, creating and storing a model of spatial correlation of intensity of precipitation for the second plurality of locations;

for each location of the second plurality of locations:

creating and storing one or more distributions of the intensity of precipitation at the location, including digitally constraining the distributions by the intensity of precipitation at the one or more other locations of the second plurality of locations and/or the data values representing the intensity of precipitation at the first plurality of locations;

extracting one or more data values representing probabilistic estimates for intensity based on the one or more data values that describe relationships and the one or more distributions of the intensity of precipitation at the location;

aggregating the extracted one or more data values into the one or more precipitation intensity fields;

using digitally programmed logic, creating and digitally storing final estimates for precipitation occurrence and intensity at one or more locations of the second plurality of locations based on the one or more precipitation occurrence fields and the one or more precipitation intensity fields.

12. The one or more non-transitory computer readable media of claim 11 wherein creating and storing the one or more precipitation occurrence fields further comprises:

creating, in digital memory of the weather computer, a coarse grid representing the occurrence of precipitation at generalized locations of the second plurality of locations;

creating the probabilistic estimates of the occurrence of precipitation at each of the second plurality of locations based, at least in part, on estimated occurrences from one or more of the generalized locations represented by the coarse grid.

13. The one or more non-transitory computer readable media of claim 11 further comprising generating and storing one or more agronomic models in digital memory of the weather computer based at least in part on the final estimates for precipitation occurrence and intensity.

14. The one or more non-transitory computer readable media of claim 13 wherein the final estimates for precipitation occurrence and intensity include one or more estimates of uncertainty, wherein the instruction, when executed by the one or more computing devices, further cause modifying the agronomic models and storing modified agronomic models in the digital memory by propagating the one or more estimates of uncertainty into the one or more agronomic models.

15. The one or more non-transitory computer readable media of claim 11, further comprising:

creating one or more elevation dependent variables in digital memory of the weather computer;

factoring in the one or more elevation dependent variables in creating the one or more precipitation occurrence fields;

factoring in the one or more elevation dependent variables in creating the one or more precipitation intensity fields.

16. The one or more non-transitory computer readable media of claim 11 wherein extracting one or more data values representing probabilistic estimates for intensity comprises:

sampling values from the one or more distributions of the intensity of precipitation at each of the locations for one or more parameters;

computing one or more likely intensities for each of the locations of the second plurality of locations based on the one or more parameters and on one or more covariates.

17. The one or more non-transitory computer readable media of claim 16 wherein the one or more covariates include latitude, longitude, and elevation.

18. The one or more non-transitory computer readable media of claim 16 wherein computing the one or more likely intensities comprises:

creating one or more covariance matrices that includes distances of each of the second plurality of locations to each of the first plurality of locations;

applying a tapering function to the one or more covariance matrices to create one or more computationally efficient covariance matrices;

calculating the one or more likely intensities using the one or more computationally efficient covariance matrices.

19. The one or more non-transitory computer readable media of claim 16 further comprising digitally augmenting the one or more precipitation intensity fields using the one or more precipitation occurrence fields.

20. The one or more non-transitory computer readable media of claim 16 further comprising:

using digitally programmed logic, generating and displaying one or more weather forecasts based, at least in part, on the final estimates for precipitation occurrence and intensity.

21. A weather computing system comprising:

one or more processors;

a memory storing instructions which, when executed by the one or more processors, cause the weather computing system to:

receive, over a computer network, one or more digital precipitation records comprising a plurality of digital data values representing an occurrence of precipitation at a first plurality of locations and an intensity of precipitation at the first plurality of locations;

create and store in a precipitation database one or more precipitation occurrence fields by:

repeating the following steps for each location of a second plurality of locations for each of any number of iterations:

a) selecting a particular location of the second plurality of locations;

b) creating a probabilistic estimate of the occurrence of precipitation at the particular location based on the occurrences of precipitation at the first plurality of locations;

c) if it is not a first iteration of the number of iterations, updating one or more probabilistic estimates of the occurrence of precipitation at first plurality of locations and at the one or more other locations of the second plurality of locations based on the probabilistic estimate of the occurrence of precipitation at the particular location;

determining whether, during a particular iteration, one or more values changed by more than a threshold value;

in response to determining that one or more values changed by more than the threshold value, performing a next iteration;

in response to determining that the one or more values did not change by more than the threshold value, aggregating the probabilistic estimates of the occurrence of precipitation at the second plurality of locations into the one or more precipitation occurrence fields;

create and store in the precipitation database one or more precipitation intensity fields by:

using the digital data values representing intensity of precipitation at the first plurality of locations, creating and storing a model of spatial correlation of intensity of precipitation for the second plurality of locations;

for each location of the second plurality of locations:

creating and storing one or more distributions of the intensity of precipitation at the location, including digitally constraining the distributions by the intensity of precipitation at the one or more other locations of the second plurality of locations and/or the data values representing the intensity of precipitation at the first plurality of locations;

extracting one or more data values representing probabilistic estimates for intensity based on the one or more data values that describe relationships and the one or more distributions of the intensity of precipitation at the location;

aggregating the extracted one or more data values into the one or more precipitation intensity fields;

create and digitally store final estimates for precipitation occurrence and intensity at one or more locations of the second plurality of locations based on the one or more precipitation occurrence fields and the one or more precipitation intensity fields.

22. The weather computing system of claim 21 wherein creating and storing the one or more precipitation occurrence fields comprises:

creating, in digital memory of the weather computing device, a coarse grid representing the occurrence of precipitation at generalized locations of the second plurality of locations;

creating the probabilistic estimates of the occurrence of precipitation at each of the second plurality of locations based, at least in part, on estimated occurrences from one or more of the generalized locations represented by the coarse grid.

23. The weather computing system of claim 21 wherein the instructions, when executed by the one or more processors further cause the weather computer system to generate and store one or more agronomic models in digital memory of the weather computing device based at least in part on the final estimates for precipitation occurrence and intensity.

24. The weather computing device of claim 23 wherein the final estimates for precipitation occurrence and intensity include one or more estimates of uncertainty;

wherein the instructions, when executed by the one or more processors, further cause the weather computer system to modify the agronomic models by propagating the one or more estimates of uncertainty into the one or more agronomic models and store modified agronomic models in the digital memory.

25. The weather computing system of claim 21, wherein the instructions, when executed by the one or more processors, further cause the weather computer system to:

create the one or more precipitation occurrence fields based at least in part on one or more elevation dependent variables;

create the one or more precipitation intensity fields based at least in part on one or more elevation dependent variables.

26. The weather computing system of claim 21, wherein the instructions, when executed by the one or more processors, further cause the weather computer system to extract the one or more data values representing probabilistic estimates for intensity by:

sampling values from the one or more distributions of the intensity of precipitation at each of the locations for one or more parameters;

computing one or more likely intensities for each of the locations of the second plurality of locations based on the one or more parameters and on one or more covariates.

27. The weather computing system of claim 26 wherein the one or more covariates include latitude, longitude, and elevation.

28. The weather computing system of claim 26, wherein the instructions, when executed by the one or more processors, further cause the weather computer system to compute the one or more likely intensities by:

creating one or more covariance matrices that includes distances of each of the second plurality of locations to each of the first plurality of locations;

applying a tapering function to the one or more covariance matrices to create one or more computationally efficient covariance matrices;

calculating the one or more likely intensities using the one or more computationally efficient covariance matrices.

29. The weather computing system of claim 26, wherein the instructions, when executed by the one or more processors, further cause the weather computer system to digitally augment the one or more precipitation intensity fields using the one or more precipitation occurrence fields.

30. The weather computing system of claim 26, wherein the instructions, when executed by the one or more processors, further cause the weather computer system to:

generate and display one or more weather forecasts based, at least in part, on the final estimates for precipitation occurrence and intensity.

* * * * *